Figure 1:
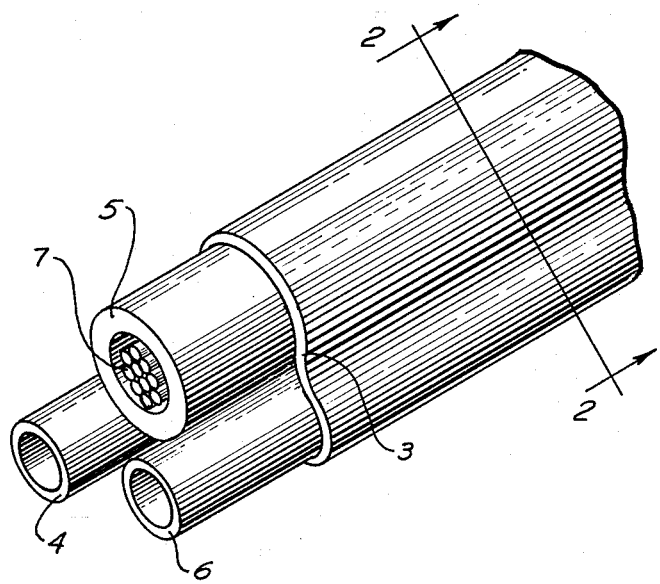

July 23, 1963 R. L. SPADE ETAL 3,098,892
WELDING CABLE
Filed Aug. 15, 1961

INVENTORS
ROBERT L. SPADE
JOHN F. VOSS
BY Soans, Anderson,
Luedeka & Fitch
ATTORNEYS 3,098,892
WELDING CABLE
Robert L. Spade and John F. Voss, Richmond, Ind., assignors to Belden Manufacturing Company, Chicago, Ill., a corporation of Illinois
Filed Aug. 15, 1961, Ser. No. 131,631
1 Claim. (Cl. 174—47)

The present invention relates generally to a welding cable and more particularly to a liquid-cooled power cable assembly used for inert-gas-shielded electric arc welding.

Various types of cables have been developed to bring needed electric power, inert system gas and liquid coolant to an electrode holder for inert-gas-shielded arc welding. The nature of such an electric arc welding process often requires electric current values considerably above those used in other types of electric arc welding. Accordingly, when current exceeds approximately 100 amps., which is often the case, a liquid coolant such as water is used to prevent the overheating of the electrode-holder and the ceramic cup used for directing the gas flow.

A problem of the industry has been to design a cable that will satisfy the necessary requirements of such a process and yet be light enough and flexible enough to be handled easily by the operator.

The main object of the present invention is to provide, for such a process, a combined hose and cable which is light in weight and very flexible. A further object of the invention is to provide an efficient, inexpensive, rugged and durable cable of the class described.

Figure 2:
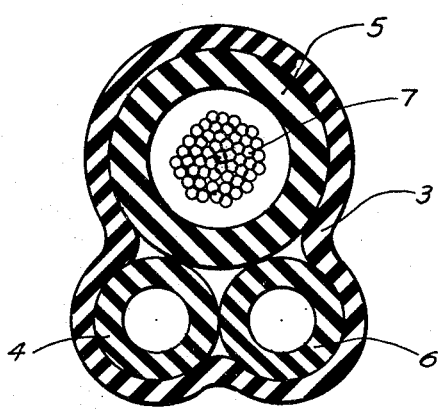

Other objects and advantages of the invention will be made apparent by reference to the accompanying drawings and the following description of certain preferred embodiments thereof. In the drawings:

FIGURE 1 is a perspective view of the end of a length of welding cable made in accordance with the invention; and FIGURE 2 is a sectional view of the cable taken along line 2—2 of FIGURE 1.

Makers and users of welding cables which are in common use have long recognized the need to cool the power supply conductor and other associated parts so as to prevent over-heating under a high current flow and yet hold down the weight and expense of material. The present invention accomplishes this objective by placing the conductor in the incoming coolant conduit, so that a constant supply of cooling water at a low temperature is assured along the length of the conductor and in intimate contact with the conductor itself.

The welding cable illustrated herein comprises an outer flexible sheath 3 of rubber, polyvinyl or other suitable tough impervious, non-conducting material that will resist the rigors of welding shop conditions and, disposed within it, three flexible tubular conduits 4, 5 and 6 which are substantially parallel.

The flexible outer sheath 3 may have a cross-section of any suitable shape as long as the area is sufficient to enclse the desired number of conduits. In the preferred embodiment shown, the sheath 3 has a generally triangular cross-section containing the three conduits 4, 5 and 6 which lead to the welding head. This design, by closely associating the three separate conduits, reduces the danger of crimping, and consequent impairment of the function of any single conduit, because all of the conduits will co-operate with one another at any point in the length of the cable to reinforce the cable.

The conduit 4 is used to supply the inert gas to the welding operation and can be made of any suitable flexible elastic impervious material which is preferably non-conductive.

Another separate conduit 5, which carries the low temperature incoming coolant to the welding head, has disposed within it a conventional, flexible bare wire electrical power conductor 7, preferably constructed of multiple strands of wire of an electrically conductive substance such as copper. The conductor 7 has an outside diameter materially less than the inside diameter of the conduit 5 so as to allow space for coolant to flow through said conduit and around the strands of the conductor 7. The conduit 5 is constructed of a flexible, elastic impervious material which is electrically non-conductive.

The remaining separate conduit 6 serves as a return for the used coolant and may be similar in construction to the inert gas conduit 4.

While only three inner conduits are shown in the illustrated device, it is recognized that additional conduits may be utilized to carry control wires, filler rod, etc., if needed for the individual operation.

In the illustrated cable, it can be seen that the size, and accordingly the expense, of the electrical conductor 7, can be reduced because of the temperature-reducing effect of the coolant. To attain a high degree of cooling from a uniform flow of coolant at its lowest temperatures, the conductor 7 is made of bare strands and is placed in a relatively confined space where a constant flow of incoming coolant is assured along the length of surface of the wire strands.

The sheath 3 serves to hold the conduits in a single package both for convenience in handling and also for the resulting combined strength in resisting crimping. The protective features of the outer sheath 3 also allow the inner conduits 4, 5 and 6, to be made of a relatively inexpensive light and flexible material, since they will not be exposed to the abrasive conditions of the welding shop.

In the manufacture of the illustrated cable, the conductor 7 is first formed by twisting together a plurality of strands, for example seven strands, each strand being composed of a number of fine wires so as to obtain the required flexibility. Then the power conductor conduit 5 is preferably extruded around the stranded conductor 7. To this end, the central plug of the extruding die is bored so as to allow the conductor 7 to be drawn through it as an incident to the extrusion process, thereby enabling conduit 5 to be loosely extruded around the conductor 7, as a tube, in continuous lengths in a conventional manner.

The other conduits 4 and 6 may also be extruded in a conventional manner. Then, the finished conduits 4, 5 and 6 can likewise be fed through the bored out plug of a suitable die of a conventional press as the outside sheath is extruded, around, and in intimate contact with, the conduits. Thus, the invention makes possible the inexpensive production of the cable in continuous lengths by conventional extrusion methods.

The embodiment disclosed herein may be changed or modified without departing from the scope of the invention.

Various features of the present invention which are now believed to be new and patentable are set forth in the appended claim.

What is claimed is:

An improved flexible cable adapted for use in an electric arc-welding system, which system involves the supply of electric welding current, a liquid coolant, and a system gas to a welding head, which cable includes a flexible stranded metallic electrical conductor for supplying welding current to the welding head, a flexible electrically non-conductive cylindrical conduit which supplies liquid coolant to the welding head and encloses said conductor leaving therein a passageway for the coolant around said conductor, a second separate flexible cylindrical conduit for returning the coolant from the welding head, a third separate flexible cylindrical conduit for conveying system gas to the welding head, said cylindrical conduits abutting one another along their lengths, and a single outer flexible non-conductive tubular protective sheath of substantially uniform wall thickness enclosing all of said conduits and being distinct from said conduits, said sheath being contiguous with portions of the outer surfaces of each of said cylindrical conduits and having an indentation formed therein between each pair of adjacent cylindrical conduits and extending inwardly toward the line of abutment thereof, so that adjacent indentations define a longitudinal channel in said sheath wherein the conduit disposed between said adjacent indentations reside, said indentations also being of generally arcuate shape so that there are open spaces between the lines of abutment of said conduits and the inner surfaces of said indentations, whereby the cable can be readily bent in any direction.

References Cited in the file of this patent

UNITED STATES PATENTS

| | | |
|---|---|---|
| 2,535,187 | Anderson et al. | Dec. 26, 1950 |
| 2,795,689 | McNutt | June 11, 1957 |
| 2,939,902 | Wreford | June 7, 1960 |